United States Patent [19]

Yates et al.

[11] Patent Number: 5,230,805
[45] Date of Patent: Jul. 27, 1993

[54] MAGNETICALLY STABILIZED FLUIDIZED PARTICLES IN LIQUID MEDIA

[75] Inventors: Stephen F. Yates, Arlington Hts.; William B. Bedwell, Chicago, both of Ill.

[73] Assignee: Allied-Signal Inc., Morris Township, Morris County, N.J.

[21] Appl. No.: 399,639

[22] Filed: Aug. 28, 1989

Related U.S. Application Data

[60] Continuation-in-part of Ser. No. 106,844, Oct. 13, 1987, abandoned, and a continuation-in-part of Ser. No. 108,887, Oct. 16, 1987, abandoned, which is a division of Ser. No. 811,614, Dec. 20, 1985, Pat. No. 4,719,241, and Ser. No. 811,622, Dec. 20, 1985, Pat. No. 4,719,242.

[51] Int. Cl.$^5$ .............................................. B01D 15/04
[52] U.S. Cl. .................................. 210/661; 210/670; 210/679; 210/683; 210/684; 210/695
[58] Field of Search ............... 210/661, 670, 677, 679, 210/683, 684, 695

[56] References Cited

U.S. PATENT DOCUMENTS

| | | | |
|---|---|---|---|
| 3,560,378 | 2/1971 | Weiss et al. | 210/36 |
| 4,115,927 | 9/1978 | Rosensweig | 34/1 |

Primary Examiner—Ivars Cintins
Attorney, Agent, or Firm—Harold N. Wells; Gerard P. Rooney; Gerhard H. Fuchs

[57] ABSTRACT

A method for the preparation of an ion exchange sorbent containing at least one anion exchange resin, a ferromagnetic substance, and a water permeable organic polymer binder, as well as a process for the use of said sorbent to separate removable anions from feedstreams containing said anion.

7 Claims, 1 Drawing Sheet

MAGNETICALLY STABILIZED FLUIDIZED PARTICLES IN LIQUID MEDIA

This is a continuation in part of U.S. application Ser. Nos. 07/106,844 and 07/108,887, fled Oct. 13, 1987 and Oct. 16, 1987, respectively, both now abandoned, which were divisional applications from U.S. application Ser. Nos. 811,614 and 811,622, both filed Dec. 20, 1985 and issued as U.S. Pat. Nos. 4,179,241 and 4,719,242, respectively.

BACKGROUND OF THE INVENTION

Recent regulations have mandated the removal of ions such as chromate ion from waste streams to a maximum acceptable level. One of the ways to capture these removable ions is to use ion exchange resins in a fixed or fluidized bed. The advantage that a fluidized bed offers is that of greater rates of flowthrough and resistance to clogging by particulate impurities, but small particles are carried out of the fluidized bed thereby contaminating the effluent and losing expensive sorbent. These disadvantages can be overcome through permanent magnetization of the sorbent particles bu resident magnetism in these particles causes flocculation to occur anywhere in the apparatus and its associated plumbing.

In U.S. Pat. No. 4,115,927 Rosensweig discusses the prior art in which magnetic fields had been applied to fluidized beds of particles and then discloses a process for fluidizing magnetizable particles characterized by operating in a magnetic field at a superficial fluid velocity which avoids fluidization by bubbling at high velocities. While the term "fluid" is used, it is clear that Rosensweig's experiments were carried out with gases rather than liquids since only gases provide the bubbling action in the fluidized bed which the patentee wished to avoid. Further, the superficial velocities reported are typical of gases rather than liquids. As will be seen in the description of the present invention which follows, the inventors have found that carrying out a process in a bed of particles fluidized with liquid presents unique conditions not found in the Rosensweig patent.

BRIEF SUMMARY OF THE INVENTION

This invention provides a process for the exchange of ions between a sorbent particle which includes a soft magnetic material and a liquid medium containing unwanted ions in a magnetically stabilized fluidized bed.

In one aspect, the invention relates to a process for contacting a bed of particles containing soft magnetic material having an average diameter of about 100 to 300 microns in an upwardly flowing liquid stream having a linear velocity of about 0.018 to about 1.0 cm/sec and in which the bed of particles is fluidized by said liquid stream and maintained between predetermined boundaries with controlled axial dispersion by maintaining a magnetic field from a DC solenoid surrounding said bed and providing between 25 to 500 gauss (in the absence of said particles). The soft magnetic material preferably will have a coercivity of less than 0.6 oersteds.

Another aspect of this invention is found in a process for the exchange of anions which comprises contacting an aqueous medium containing removable anions with sorbent particles having an average diameter of about 100 to 300 microns, said sorbent being a homogeneous composite of an anion exchange resin, a soft ferromagnetic substance, and a water permeable organic polymer binder, in an ion exchange zone under the influence of a magnetic field providing about 25 gauss to about 500 gauss (in the absence of said particles) sufficient to stabilize said sorbent as a fluidized bed comprising the steps of a) loading said sorbent by passing an acidic aqueous feedstream at a pH from about 1 to 4 containing removable anions through said magnetically stabilized fluidized bed at a flow rate ranging from about 0.018 to about 1.0 cm/sec that affords maximum sorption of said anions by said sorbent resulting in a purified feedstream;

b) stripping said sorbent of said removable anions by passing a basic aqueous stream at a pH from about 8 to about 14 through said magnetically stabilized fluidized bed at a flow rate ranging from about 0.018 to about 1.0 cm/sec and discarding or reusing said effluent stream; and c) regenerating said sorbent by passing an acidic aqueous stream at a pH from about 1 to about 3 through said magnetically stabilized fluidized bed at a flow rate from about 0.018 to about 1.0 cm/sec.

DETAILED DESCRIPTION OF THE INVENTION

Figure 1:
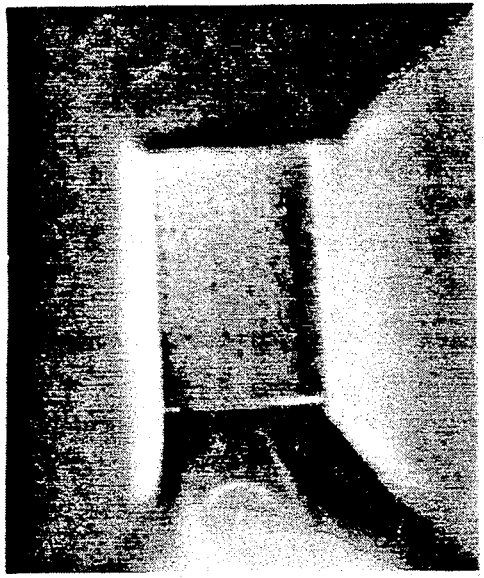
FIG. 1 is a photograph of a fluidized bed with a magnetic field providing 46 gauss (in the absence of particles).

Broadly, the invention is related to the contacting of fluidized particles in an upwardly flowing liquid stream where the particles are stabilized in a fluidized bed by a magnetic field. In one aspect, the present invention is concerned with the removal of removable anions from liquid streams containing such ions using an ion exchange sorbent containing a soft ferromagnetic substance in a magnetically stabilized fluidized bed process.

Sorbent Particles Composition

In order to prepare the sorbent, a weak anion exchange resin can be transformed from the ordinary bead appearance to a dry powder having a particle size of from about 10 microns to about 150 microns, using any method known to a person skilled in the art. The weakly basic anion exchange resin comprises polymeric amines, such as crosslinked polyvinylbenzyldimethylamine, but other weakly basic anion exchange resins should function in this invention though not necessarily with equivalent results. It is also contemplated within the scope of this invention that mixtures of weakly basic anion exchange resins can also be used.

A second ingredient is a ferromagnetic substance, preferably in powdered form, whose purpose is to cause the sorbent to have its movement restricted while under the influence of a magnetic field. Two general classifications of these ferromagnetic substances are known to the art and include the class called hard magnetic substances and the class called soft magnetic substances. A hard magnetic substance is a material which retains its magnetism after the inducing magnetic field is shut off, while a soft magnetic substance is a material which rapidly loses most of its magnetism after the inducing magnetic field is turned off, and has a high magnetic permeability and a low coercivity. In this application and in the appended claims the use of the term ferromagnetic substance is to be read to mean a soft ferromagnetic substance.

The third ingredient in the sorbent is a water permeable organic polymer binder whose purpose is to hold together the resin and the ferromagnetic substance in discrete particles capable of sorbing said removable anions from a liquid stream containing such ions, and for this purpose is best chosen with smaller alkyl pendant or substituent groups so as to be a more polar binder. For purposes of this application and in the appended claim, the term sorbent will refer to particles capable of absorbing the removable anions from the liquid stream containing said ions. The term water permeable will include both water permeablility and substrate permeablility, thus the binder must be permeable to both water and to the ions to be removed.

Soft Magnetic Materials

Soft magnetic substances may be generally defined as materials which are easily magnetized and which are readily demagnetized. The are characterized by high permeability and low coercivity and are found within six major crystalline groupings including iron and low carbon steels, iron-silicon alloys, iron-aluminum and iron-aluminum-silicon alloys, nickel-iron alloys, iron-cobalt alloys, and ferrites, as well as amorphous soft magnetic alloys near the $(Fe_1CO_1Ni)_{80}(P_1B_1Al_1Si_1C)_{20}$ composition where the eighty and twenty refer to percent composition respectively. Any or all of these alloys types may provide a soft magnetic substance useful in sorbents useful in the invention, however, it should be understood that the performance of the stabilized fluid beds of the invention will be determined by various factors and the selection of the soft magnetic material will be only one of such factors. In general, selection of a material with a low coercivity , preferably less than 0.6 oersteds, is considered of particular importance. Iron alloys can be taken from the group including, but not limiting to 3% silicon, 4% silicon, 30% silicon, 45% silicon (Permalloy), 50% nickel (Hipernik), 78.5% nickel (78 Permalloy) 4% molybdenum and 79% nickel (Supermalloy), 5% copper, 2% chromium and 77% nickel (Mumetal), 3% molybdenum, 14% copper, and 72% nickel (1040 alloy), 50% cobalt (Permendur), 1.8% vanadium and 49% cobalt (Vanadium Permendur), and 5% aluminum and 10% silicon (Sendust) wherein all percents are by weight and enough iron is added to make 100% by weight of each alloy. Particularly preferred are iron-nickel alloys containing more than 40 wt. % nickel.

Anion Exchange Resins

The anion exchange resin can be either gel-type or macroreticular and includes, but is not limited to, resins manufactured by the Rohm & Haas Corporation known in the trade as "Amberlite" and as "Duolite" as well as those manufactured by the Dow Corporation and known in the trade as "Dowex⇌. Other anion exchange resins manufactured by other corporations can also be used by not necessarily with equivalent results.

Representative examples of the anion exchange results of the weakly basic gel-type polystyrene or phenolic polyamine include Amberlite IRA-45, IR-48, IRA-68, IRA-60, and IRA-58, Duolite A-6, A-4F, ES-375, and A-340, and Dowex WGR and WGR-Z.

Representative examples of the anion exchange resins of the macroreticular type include Amberlite IRA-35, IRA-93, IRA-94, IRA-99, and Amberlyst A-21, Duolite ES-308, ES-368, ES-366, A-7, A-374, A-378, and A-561, and Dowex MWA-1.

Mixtures of the gel-type anion exchange resins with the macroreticular anion exchange resins are capable of functioning in this invention as are mixtures of the gel-type or mixtures of the macroreticular type resins. For instance, Amberlite IRA-68 might be mixed with Amberlite IRA-45, Amberlite IRA-68 might be mixed with Duolite ES-375, Amberlite IR-48 might be mixed with Amberlite IRA-60, and Duolite ES-375 might be mixed with Dowex WGR.

Binders

The binders are water permeable and will be found as members of the group consisting of polyurethanes, cellulose esters, and cellulose ethers.

The material to make the binder can include, but is not limited to, the foamable hydrophilic prepolymers basically derived from toluene diisocyanate manufactured by W. R. Grace & Company and known in the trade as "HYPOL" polymers, examples of which include FHP2000, FHP3000, and FHP2002. Of course, other polyurethane prepolymers will function in this invention but not necessarily with equivalent results.

When polyurethanes are used as a binder, preparation of the sorbent entails a mixing of binder prepolymer monomers in a solvent to form a solution of the binder. This binder solution is then mixed with the powdered anion exchange resin, water, and the powdered ferromagnetic substance to form a homogeneous mixture. Subsequent controlled polymerization forms a gel which is subsequently dried to a solid and formed to the desirable shape and size.

An example of the third method for preparation of the sorbent involves adding together, with stirring, two separately prepared mixtures, the first one containing the prepolymer and the ferromagnetic substance and the second containing the ion exchange resin and water. In this manner, a 2:1 mixture of isocyanate prepolymer FHP2000 and a 1:1 nickel-iron alloy is combined with a 3:8 mixture of finely ground Amberlite IRA-68 and water. Stirring is continued until solidification occurs, and then the mixture is broken into small pieces, dried, and ground to the appropriate size. Possible methods of drying include drying under vacuum with or without heating, and conventional oven drying, all performed at temperatures ranging from about 10° C. to about 110° C.

The binder also can include, but is not limited to, cellulose ethers such as ethyl cellulose, methyl cellulose, propyl cellulose, butyl cellulose, hydroxyethyl cellulose, hydroxypropyl cellulose, cyanoethyl cellulose, and diethylaminoethyl cellulose, as well as cellulose esters such as cellulose acetate, cellulose nitrate, cellulose sulfate, cellulose butyrate, cellulose propionate, cellulose isobutyrate, cellulose benzoate, and cellulose acetate-butyrate.

Solvents for use with cellulose esters or ethers can include, but are not limited to, acetone, p-dioxane, methyl ethyl ketone, ethyl acetone, chloroform, benzyl alcohol, cyclohexanone, formamide, acetic acid, diethylketone, toluene, and acetonitrile, For purposes of this application and the appended claims, the word solvent will be taken to mean both a single solvent as well as a mixture of solvents.

One method for preparation of the sorbent of this invention utilizes a mixing of the resin with the ferromagnetic substance, and then with a water permeable organic polymer binder prior to introduction of the solvent, in such a way as to minimize the stratification of these ingredients. Once a homogeneous mixture is achieved, a solvent is introduced to dissolve the binder thus resulting in formation of a malleable mixture which is then dried to a solid and formed to the desirable shape and size. Possible methods of drying include extrusion into water to remove the solvent followed by further drying to remove the water, drying under vacuum with or without heating, and conventional oven drying, all performed at temperatures ranging from about 10° C. to about 110° C. The resultant solid can be formed by methods including, but not limited to, extrusion, chopping, grinding, and extrusion combined with chopping or grinding.

Another possible method for the preparation of this sorbent utilizes the same ingredients as the first method but differs in that the ferromagnetic substance and the resin are first mixed together in powdered form and then this powder mixture is added to a separate mixture of the binder with the solvent to form the malleable mixture which is then treated as in the before-mentioned method.

After forming to the desired size and shape, the sorbent particles will contain the ion exchange resin in a range from about 30 wt. % to about 85 wt. %, the ferromagnetic substance in a range from about 5 wt. % to about 30 wt. %, and the water permeable organic polymer binder in a range from about 10 wt. % to about 50 wt. %. In one embodiment, the sorbent particles range from about 100 microns to about 300 microns, which may be obtained by passing particles through a 50 mesh screen and onto a 140 mesh screen.

Fluidized Bed Processing

Ion exchange can be accomplished utilizing methods such as fixed beds, fluidized beds, and magnetically stabilized fluidized beds (MSFB). While fixed bed problems such as high pressure and low flow rate can be alleviated through use of a fluidized bed, this use of a fluidized bed introduces new problems concerning the movement of the particles of the fluidized bed. As reported by Rosensweig, fluidized a bed or particles with a gas is best done at a superficial velocity which avoids unstable bubbling. When a liquid is used, bubbling does not occur and no unstable flow regime is found. However, loss of particles will limit the velocities which may be used. When liquids are used as a fluidizing medium, their higher density and viscosity effectively entrain small particles making loss of particles a much more sever problem for liquids than for gases. Prior art (see U.S. Pat. No. 3,560,378) attempted to correct these problems by use of magnetic stabilization of these mobile particles but said art used hard magnetic substances whereas this invention incorporates soft ferromagnetic substances to curtail the effluent contamination by sorbent fines as well as to control the migration of sorbent or fluid throughout the bed (axial dispersion).

The sorbent of this invention is held in place in the MSFB through use of an external homogeneous magnetic field which provides from about 25 gauss to about 500 gauss when measured in the absence of particles. The magnetic flux density (measured in gauss or Tesla) is related to the external field strength by the equation $$B = \mu(H + M)$$

where $H$ is the external field strength, $M$ is the magnetization of the magnetic materials (measured in oersted or A/m) and $\mu$ is the magnetic permeability. In the absence of magnetic materials, these units are defined so that a field strength of one oersted (79.58 A/m) provides a flux density of one gauss ($10^{-4}$T). Our measurements of the magnetic flux density were made in the absence of particles and references to gauss should be understood to be on that basis. When magnetic materials are present, the flux densities are much higher than the gauss values given for an empty column.

Such stabilization results in a diminishing of the axial dispersion normally present in a fluidized operation as well as in a formation of the sorbent particles into linear networks instead of the cross-linked network arrangement found in the prior art. These linear networks form with soft magnetic materials because the magnetic moments particles remain aligned with the external field. In contrast, the moments of particles with hard magnetic materials orient toward each other, causing three dimensional aggregation. Said prior art utilized hard magnetic substances that were magnetized externally and then utilized in a fluidized bed separation. Such particles required occasional external remagnetizations, and probably caused clogging problems due to flocculation in the associated plumbing of the MSFB. In this invention, the sorbents do not require external remagnetization as they are magnetic at any time the external magnetic field is applied and the sorbents do not cause flocculation problems in that the sorbent particles lose most of their magnetism upon cessation of the external magnetic field.

Through use of the magnetically stabilized fluidized bed (MSFB) the sorbent of this invention is utilized in a process for the exchange of anions which comprises subjecting a liquid medium containing removable anions to contact with a sorbent, said sorbent being a composite of at least one anion exchange resin, a ferromagnetic substance, and a water permeable organic polymer binder, in an ion exchange zone under the influence of a magnetic field of strength sufficient to stabilize said sorbent as a fluidized bed comprising the steps of a) loading said sorbent bypassing an acidic aqueous feedstream containing removable anions through said fluidized bed at a flow rate that affords maximum sorption of said ions by said sorbent resulting in a purified feedstream b) stripping said sorbent of said removable anions by passing a basic aqueous stream through said fluidized bed and discarding said effluent stream; and, c) generating said sorbent by passing an acidic aqueous stream through said fluidized bed.

In the above mentioned process, regeneration of this sorbent occurs at a pH of from 1 to about 3, loading of the sorbent occurs at a pH of from 1 to about 4, and stripping of said sorbent occurs at a pH of from about 8 to about 14, and the flow rate ranges from about 0.018 to about 1.0 centimeter per second.

Removable anions sorbed by the sorbent of this invention include, but are not limited to, the hexavalent oxidation state, (an oxidation number of plus six), a chromium, selenium, sulfur, and manganese. These removable anions are found in waste streams such as metal finishing streams as well as in cooling water blowdown and other similar operations. Other ions which can be removed include tetrachloroplatinate ions and tetrachloropalladate ions. It is contemplated as within the scope of this invention to run this ion exchange process in a semi-batch manner in which the feedstream is passed through the bed until the sorbent capacity is reached and then is regenerated. Alternatively, the process can be operated continuously with a portion of the sorbent being continuously removed, regenerated, and returned to the fluidized bed.

EXAMPLE I

In an open beaker, 3 grams (g) of finely ground Amberlite IRA-68 ion exchange powder, and 160 milliliter (mL) water were mixed, yielding a viscous suspension. In a second beaker, 20 g of HYPOL FHP2000 polyurethane prepolymer was mixed with 10 g of 1:1 nickel-iron alloy and stirred until the mixture appeared homogeneous. Subsequently, the aqueous suspension was added to the prepolymer mixture with rapid stirring thereby forming a foaming mixture which rapidly became more viscous until a slightly elastic dense foam was obtained. This solid foam was then crumbled into small pieces and heated to 110° C. for 2 days.

EXAMPLE II

A 2.5 centimeter (cm) glass column was mounted vertically in the center of a water-cooled cylindrical DC solenoid magnet (length 660 cm, 152 cm I.D.), powered by a Hewlett Packard 6274B D.C. power supply. A small circle of steel mesh blocked the inlet of the column and supported 50 mL of 3 mm glass beads. The column was charged with 43 mL of the dry sorbent, a 90 gauss (G) magnetic field was applied which provided 90 Gauss in the column (in the absence of particles) and a feedwater stream was admitted at the base of the column with a velocity of 0.34 cm/sec, which is a velocity sufficient to fluidize the sorbent particles. The pH of the feedstream was acidified until the effluent stream had a pH of 2.95 at which time the feedstream was changed to pH 3.0 water containing 0.24% by weight sodium dichromate. Samples of the effluent stream were taken periodically for analysis wherein the concentrations were determined by atomic absorption spectrophotometry. The chromium (VI) concentration was measured by adding tartaric acid and 1,5-diphenylhydrazide to the sample, agitating it, and then measuring the absorption of the sample at 540 nanometers (nm). The results of these analyses indicated that breakthrough of the sodium occurred almost immediately, but breakthrough of the chromium (VI) was delayed for 35 minutes. Once breakthrough of the chromium (VI) had occurred, the feed was changed to water, then to 0.5 sodium hydroxide in order to strip the chromium (VI) from the column as a more concentrated stream.

EXAMPLE III

In an open pan, 200 grams (g) of Amberlite IRA-68 (Rohm and Haas weak anion exchange resin) was heated to 104° C. or 3 days. The resin was then ground in a ball mill and screened and the fraction which passed through the 140 mesh screen was used in the following procedure.

In an open beaker, 20 g powdered Amberlite IRA-68, 5 g powdered 1:1 nickel-ion alloy, and 7 g powdered Eastman Kodak cellulose acetate were mixed until the mixture appeared homogeneous. To this mixture was added in small portions a total of 43 mL acetone was continuous stirring. The mixture darkened in color and became lumpy, then acquired the consistency of bread dough. After kneading this material until it appeared homogeneous, the paste was transferred to an evaporating dish, chopped into small pieces, and placed in a 50° C. oven overnight. The hard and brittle product was then ground in a mechanical grinder to obtain 28.65 g of 20-50 mesh material and 6.6 g of 50-140 mesh material.

EXAMPLE IV

In an open beaker, 30 g of finely ground Amberlite IRA-68 ion exchange powder, 10 g of ethylcellulose, and 20 g of 1:1 nickel-iron alloy were dry mixed until the mixture appeared homogeneous. To this mixture was gradually added a total of 70 milliliters (mL) of acetone with continuous stirring, resulting in a mixture with a dough-like consistency. This dough was broken into small pieces, air-dried at room temperature for 2 hours, heated to 105° C. for 12 hours, and now brittle solid was ground to granular particles of a 50-140 mesh size.

EXAMPLE V

In an open beaker, 30 g of finely ground Amberlite IRA-68 ion exchange powder, 10 g of cellulose acetate and 20 g of 1:1 nickel-iron alloy were mixed dry until the mixture appeared homogeneous. To this mixture was gradually added 35 mL of acetone with continuous stirring resulting in a mixture with a dough-like consistency. This dough was extruded through a ⅛ inch circular die into a pan of water, the resulting strands were soaked in water for 24 hours, allowed to dry, and ground to granular particles of a 50-140 mesh size.

EXAMPLE VI

The apparatus described in Example II was charged with 66 mL of the dry sorbent. A magnetic field was applied which provided 90 gauss in the column (in the absence of particles), and a feedwater stream was admitted at the base of the column with a velocity of 0.34 cm/sec, which is a velocity sufficient to fluidize the sorbent particles. The pH of the feedstream was acidified until the effluent stream had a pH of 3.16 at which time the feedstream was changed to pH 3.0 water containing 4.1 parts per million (ppm) zinc, 2.4 ppm cadmium, 3.6 ppm chromium (III), and 11.4 ppm chromium (VI).

Samples of the effluent stream were taken periodically for analysis wherein the concentrations were determined by atomic absorption spectrophotometry. The chromium (VI) concentration wa measured by adding tartaric acid and 1,5-diphenylhydrazide to the sample, agitating it, and then measuring the absorption of the sample at 540 nanometers (nm). The results of these analyses indicated that breakthrough of the zinc and cadmium occurred immediately, but breakthrough of the chromium (VI) never occurred. After 212 minutes the feed was changed to water and then at 242 minutes the feed was changed to 0.1 M sodium bicarbonate in order to strip the chromium (VI) from the column as a concentrated stream.

EXAMPLE VII (Comparative) In a small beaker, 7.1 g of finely ground Amberlite IRA-68, 7.9 g of finely ground IRC- 84, 50 of barium ferrite (a hard magnetic substance), and 10 g of ethyl cellulose were mixed intimately as powders. To the resulting mixture was added in portions 50 mL of acetone. The mixture was stirred throughout the addition, resulting in a dark grey paste. This paste was spread in an evaporating dish, and then heated in an oven at 105° C. for 4 hours. The material was then ground to 20-50 mesh.

EXAMPLE VIII

The apparatus described in Example II was used. A thin glass tube was used to sample the water at various heights in the bed. This tube was equipped with a separate small pump to withdraw fluid from the column and pass it through a 1-cm flow cell in a Perkin Elmer UV spectrophotometer. The flow of fluid through the column was visualized by injecting a pulse of 0.5 mL of blue dye (a 0.001 M aqueous solution of copper phthalocyaninetetrasulfonic acid) into the inlet line to the column, and observing the flow of this dye through the column.

Magnetic resin having a mean particle size of 438 microns was added to a depth of 7.8 cm. When the water pump was turned on (50 mL/min, 0.17 cm/sec) the resin was fluidized to a depth of 17-27 cm with resin evenly dispersed from side to side in the column. Axially, the particle density was somewhat higher at the base of the fluidized column that at the top, but no gaps were apparent.

When pulses of dye were injected into the column, they dispersed evenly and resulted in a pulse of dye detected at the UV spectrophotometer. The width of this pulse depended on the strength of the magnetic field applied to the column. Axial dispersion coefficients were calculated from the observed peak widths and show that axial dispersion decreased as the field strength was increased to provide from 0 to 500 gauss in the column (in the absence of particles) as can be seen from the following Table.

| Axial Dispersion Coefficient ($cm^2$/sec) | Gauss |
| --- | --- |
| 4.3 | 0 |
| 1.8 | 140 |
| 1.5 | 280 |
| 0.8 | 410 |
| 0.75 | 550 |

The axial dispersion coefficient is a measure of the degree of back mixing in the particle bed and is determined by injecting dye into the column and measuring the shape of the pulse at the top of the bed (see O. Levenspiel and W. K Smith, Chem. Eng. Sci. 6, 227 (1957. It will be evident that back mixing is much reduced as the magnetic field strength is increased.

EXAMPLE IX (Comparative). The same apparatus as that described in Example II as modified in Example VIII was used. A sample of 10 g of 20-50 mesh resin of the type described in Example VI was used. Fluidization of this resin was difficult, since the resin aggregated into lumps even at zero field. These lumps fluidized and could only be partially broken up by varying the flow rate. Injection of pulses of dye showed that flow through this bed was irregular (non-plug flow). The dye was observed to exit the top of the bed as several small streams rather than an even flow, and gave peaks with skewed shapes or multiple smaller peaks. Due to the skewed peak shapes no axial dispersion calculations were possible.

EXAMPLE X

Figure 2:
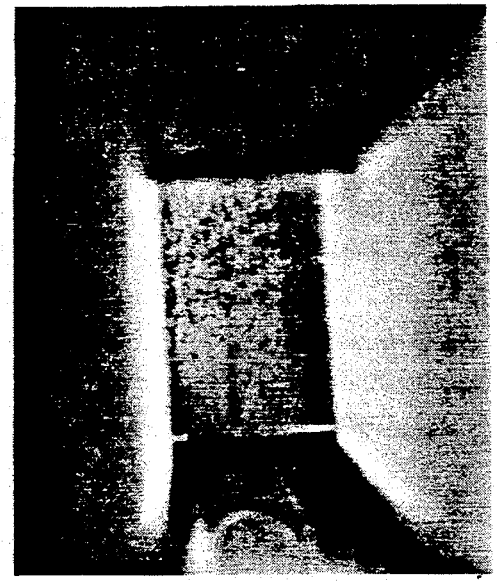
FIG. 2 is a photograph of the fluidized bed of FIG. 1 with a magnetic field providing 150 gauss (in the absence of particles).
Figure 3:
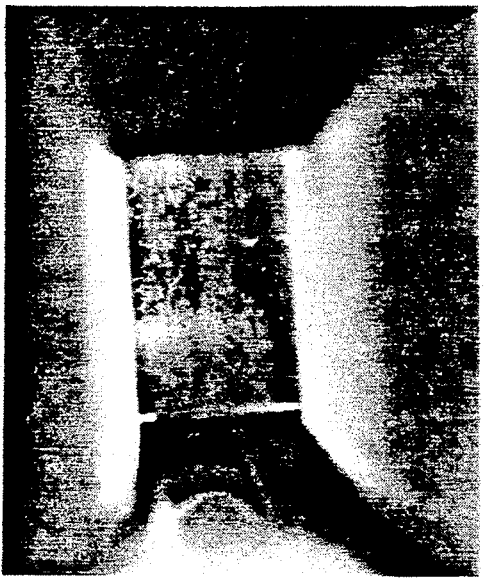
FIG. 3 is a photograph of the fluidized bed of FIG. 1 with a magnetic field providing 290 gauss (in the absence of particles).
Figure 4:
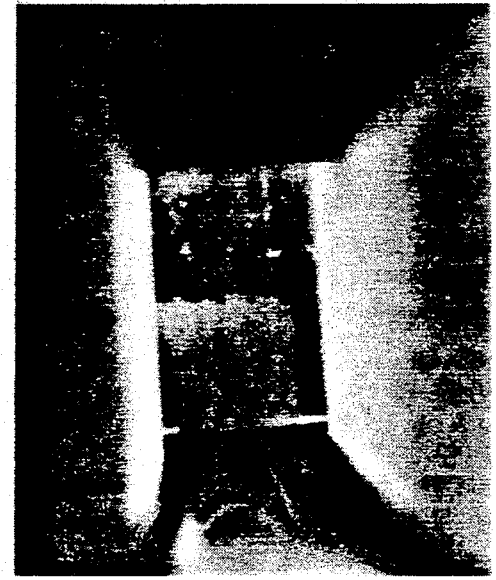
FIG. 4 is a photograph of the fluidized bed of FIG. 1 with a magnetic field providing 570 gauss (in the absence of particles).

The apparatus described in Example II was used. Magnetic resin having a mean particle size of 592 microns was added to a depth of 15.6 cm. When the water pump was turned on (210 mL/min, 0.71 cm/sec), the resin was fluidized to a height of 56 cm. Increasing the magnetic field strength had no effect on the fluidized height, but did result in a "sharpening" of the upper boundary. This illustrated in FIGS. 1-4 in which an increasing magnetic field strength was applied. Note that in FIG. 1 a magnetic field was employed which provided 46 gauss in the column (in the absence of particles) with the relatively large particles used in this experiment. This field strength had essentially no observed effect and appeared to be similar to the bed with no magnetic field applied. FIGS. 2 through 4 show the effect on the bed as the applied magnetic field is raised to provide 150 gauss, 290 gauss, and then 570 gauss, in the column (in the absence of particles), respectively. It will be clear that the bed becomes better defined and entrainment is much reduced. Close examination revealed that at the higher field strengths, the particles in the upper portion of the bed were loosely aggregated into strings colinear with the column.

EXAMPLE XI (Comparative). A 500 mL three neck round bottom flask was equipped with a Chesapeake stirrer, condenser, nitrogen inlet, and thermometer and was flushed with nitrogen. To this was added 1.5 g of sodium dioctylsulfosuccinate and 150 mL of mineral oil. The mixture was stirred vigorously until the succinate dissolved completely, generating a cloudy solution. In a separate small beaker cooled in ice, 14.8 g of sodium hydroxide were dissolved in 30 mL of water. To this was added 25 ml of acrylic acid in portions. A white slurry was obtained. Now 11.4 g of methylenebisacrylamide and 19.6 of magnetite (a hard magnetic substance) were added, and the resulting black paste was transferred to the reaction flask. Vigorous stirring was used to disperse the paste in the oil. A solution of 0.205 g of ammonium persulfate in 3 mL of water was added. The temperature rose immediately to 60° C. External heating was then applied to bring the temperature to 95° C. overnight.

After cooling to room temperature, the reaction mixture was filtered with suction. The black product was rinsed with hexane to remove the oil, then with 2 N sulfuric acid, then with water. The product was then dried in an oven at 50° C.

When tested as in Example II, poor contacting was observed as a result of aggregation of the particles.

We claim:

1. A process for the contacting of a bed of particles having an average diameter of 100-300 microns with an upwardly flowing liquid stream having a linear velocity of about 0.018 to about 1.0 cm/sec whereby the bed of particles is fluidized and maintained between determined boundaries with controlled axial dispersion by maintaining a magnetic-field from a DC solenoid encircling said bed and providing about 25 to about 500 gauss in the absence of said particles and wherein the particles comprise a soft magnetic material.

2. A process for the exchange of ions by contacting an aqueous feedstream containing removable anions with sorbent particles having an average diameter of about 100-300 microns, said sorbent being a homogeneous composite of an anion exchange resin, a soft ferromagnetic substance which rapidly loses magnetism in the absence of a magnetic field, and a water permeable organic polymer binder selected from the group consisting of polyurethanes, cellulose esters, and cellulose ethers in an ion exchange zone under the influence of a magnetic field providing about 25 gauss to about 500 gauss in the absence of said particles and sufficient to stabilize said sorbent as a fluidized bed comprising the steps of a) loading said sorbent by passing an acidic aqueous feedstream at a pH from about 1 to about 4 containing removable anions through said magnetically stabilized fluidized bed at a flow rate ranging from about 0.018 to about 1.0 cm/sec that affords maximum sorption of said ions by said sorbent resulting in a purified feedstream;

b) stripping said sorbent of said removable anions by passing an aqueous stream at a pH from about 8 to about 14 through said magnetically stabilized fluidized bed at a flow rate ranging from about 0.018 to about 1.0 cm/sec and discarding or reusing said effluent stream.

c) regenerating said sorbent by passing an aqueous stream at a pH from about 1 to about 3 through said magnetically stabilized fluidized bed at a flow rate ranging from about 0.018 to about 1.0 cm/sec.

3. The process of claim 2, wherein said removable anions are those of chromium in the hexavalent oxidation state.

4. The process of claim 2 wherein said removable anions are those of sulfur.

5. The process of claim 2 wherein said removable anions are those of selenium.

6. The process of claim 2 wherein said removable anions are those of manganese in the hexavalent oxidation state.

7. The process of claim 2 wherein said removable anions are those of tetrachloroplatinate and tetrachloropalladate.

* * * * *